(12) United States Patent
Xue et al.

(10) Patent No.: US 12,540,716 B2
(45) Date of Patent: Feb. 3, 2026

(54) EMBEDDED LIGHT-SWEEPING LUMINAIRE

(71) Applicants: Self Electronics Co., Ltd., Zhejiang (CN); Self Electronics USA Corporation, Norcross, GA (US)

(72) Inventors: Yuanfang Xue, Zhejiang (CN); Fawei Zhang, Zhejiang (CN); Zhaoyong Zheng, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 19/090,624

(22) Filed: Mar. 26, 2025

(65) Prior Publication Data

US 2026/0002656 A1 Jan. 1, 2026

(30) Foreign Application Priority Data

Jun. 27, 2024 (CN) .......................... 202410850405.8

(51) Int. Cl.
| | | |
|---|---|---|
| *F21V 5/08* | (2006.01) | |
| *F21S 4/28* | (2016.01) | |
| *F21V 7/00* | (2006.01) | |
| *F21Y 103/10* | (2016.01) | |
| *F21Y 115/10* | (2016.01) | |

(52) U.S. Cl.
CPC .................. *F21V 5/08* (2013.01); *F21S 4/28* (2016.01); *F21V 7/005* (2013.01); *F21Y 2103/10* (2016.08); *F21Y 2115/10* (2016.08)

(58) Field of Classification Search
CPC .... F21V 5/08; F21V 7/005; F21S 4/28; F21Y 2103/10; F21Y 2115/10
See application file for complete search history.

(56) References Cited

U.S. PATENT DOCUMENTS

| | | | |
|---|---|---|---|
| 2014/0071692 A1* | 3/2014 | Zhang | G02B 19/0061 362/327 |
| 2014/0071693 A1* | 3/2014 | Zhang | G02B 19/0028 362/327 |
| 2016/0040840 A1* | 2/2016 | Gattari | F21V 5/002 362/328 |
| 2019/0011110 A1* | 1/2019 | Kim | F21V 7/0091 |
| 2022/0120395 A1* | 4/2022 | Bu | F21V 7/0016 |

* cited by examiner

*Primary Examiner* — Evan P Dzierzynski
(74) *Attorney, Agent, or Firm* — Wang Law Firm, Inc.

(57) ABSTRACT

An embedded light-sweeping luminaire has a lamp holder, a light source module and a lens column arranged in the lamp holder. The light source module has an LED light source and the lens column is disposed in the light emitting path of the LED light source and is configured to emit light to the first irradiation surface directly facing the light emitting direction and the second irradiation surface in the lateral direction. The lens column has a light incident surface, a light emitting surface, a first total reflection surface arranged on one side of the lens column facing the second irradiation surface, and a second total reflection surface arranged on the side of the lens column away from the second irradiation surface and extending from the other end of the light incident surface toward the light emitting surface along the light emitting direction.

10 Claims, 6 Drawing Sheets

EMBEDDED LIGHT-SWEEPING LUMINAIRE

RELATED APPLICATION

This present application claims priority of Chinese patent application no. CN 202410850405.8 filed on Jun. 27, 2024, the disclosures of which are incorporated herein by reference in its entirety.

FIELD OF THE TECHNOLOGY

The present invention relates to the field of lighting fixtures, and in particular, to a high-efficiency embedded light-sweeping luminaire.

BACKGROUND

Cabinet lights are widely used in the market and can be installed in wardrobes, showcases, wine cabinets, base cabinets, etc. for auxiliary lighting. Existing embedded cabinet lights or embedded laminate lights mostly adopt the assembly scheme of flexible strips, aluminum profiles, and milky white lampshades to achieve anti-glare effect and low costs. However, the luminous efficiency of such cabinet lights is usually only 30-40 lm/W. Moreover, the size of this kind of light is relatively large, which is not suitable for the design trend of thinner lights. And traditional cabinet or laminate lighting is often faced with problems such as a small light-emitting angle, uneven light sweeping, and localized area light-dark boundary, thus cannot achieve full-bright lighting of the three-dimensional space among the laminates of the shelf.

Accordingly, those skilled in the art are committed to developing a high-efficiency embedded light-sweeping luminaire to solve the above problems.

BRIEF SUMMARY

In view of this, the technical problem to be solved by the present invention is the low luminous efficiency and poor light-sweeping effect of the existing cabinet lights and shelf lights.

In order to achieve the above objects, the present invention provides an embedded light-sweeping luminaire, characterized in that, comprising a lamp holder, a light source module and a lens column arranged in the lamp holder;

the light source module comprises a substrate and at least one LED light source electrically connected to the substrate, the lens column is disposed in the light emitting path of the LED light source and is configured to emit light to the first irradiation surface directly facing the light emitting direction and the second irradiation surface in the lateral direction;

the lamp holder comprises a base plate and two side plates connected to both sides of the base plate, a substrate of the light source module is fixedly connected to the base plate, and the lens column is clamped between the two side plates;

the lens column comprises: a light incident surface arranged close to the LED light source, a light emitting surface covering the opening of the lamp holder facing the first irradiation surface, a first total reflection surface arranged on one side of the lens column facing the second irradiation surface and extending from one end of the light incident surface toward the light emitting surface along the light emitting direction, and a second total reflection surface arranged on the side of the lens column away from the second irradiation surface and extending from the other end of the light incident surface toward the light emitting surface along the light emitting direction;

the LED light source comprises a chip optical axis, both the light incident surface and the light emitting surface intersect with the chip optical axis, the first total reflection surface and the second total reflection surface are respectively located on both sides of the chip optical axis, in the radial section passed by the chip optical axis, the radial size of the light incident surface is smaller than that of the light emitting surface, the contour of the first total reflection surface in the radial section forms an acute angle with the chip optical axis, the first total reflection surface is configured to reflect part of the light entering the lens column and then cause the light to emit toward the first irradiation surface, and the second total reflection surface is configured to reflect part of the light entering the lens column and then cause the light to emit toward the second irradiation surface.

According to a further embodiment, in the radial section passed by the chip optical axis, the angle formed by the contour of the first total reflection surface and the chip optical axis is 10°-30°, and the contour of the second total reflection surface is parallel to the chip optical axis.

According to a further embodiment, the extending end of the first total reflection surface and/or the second total reflection surface away from the light incident surface is connected to the end of the light emitting surface through a transition surface.

According to a further embodiment, the first total reflection surface connects the ends of the light incident surface and the light emitting surface on the same side, and the extending end of the second total reflection surface away from the light incident surface connects to the transition surface, and the transition surface extends toward the end of the light emitting surface away from the second irradiation surface.

According to a further embodiment, the first total reflection surface connects the ends of the light incident surface and the light emitting surface on the same side, and the extending end of the second total reflection surface away from the light incident surface connects to the transition surface, and the transition surface extends toward the end of the light emitting surface away from the second irradiation surface.

According to a further embodiment, in the radial section passed by the chip optical axis, the projection of the light incident surface along the chip optical axis covers the projection of the LED light source.

According to a further embodiment, in the radial section passed by the chip optical axis, for the light emitted from the LED light source and capable of irradiating the second total reflection surface, the maximum incident angle of the light reaching the light incident surface is set to be not less than 60°.

According to a further embodiment, a clamping block is protrudingly formed on the inner side of the side plate, and clamping portions are formed on both sides of the lens column, each of the clamping portions extends obliquely toward the side plate, the clamping block comprises a guiding surface and an abutting surface, the guiding surface is connected to the opening of the lamp holder, the abutting surface and the guiding surface form an obtuse angle and the abutting surface is configured to abut against the clamping portion.

According to a further embodiment, a light-diffusion layer is provided on the light emitting surface.

According to a further embodiment, the lamp holder is long strip shaped, and the lamp holder includes a length direction, the substrate and the lens column both extend along the length direction, a plurality of LED light sources are provided on the substrate and are distributed at intervals along the length direction.

According to a further embodiment, a strip shaped convex lens array is provided on the light emitting surface, which is arranged along the length direction of the luminaire and is configured to stretch the light-emitting spot of each LED light source along the length direction and cause the light-emitting spots of adjacent LED light sources to dock or overlap.

Technical Effects of the Invention

The embedded light-sweeping luminaire of the present invention is configured to emit light at a large beam angle through the design of the total reflection surfaces of the lens column, which can better cover most areas of the first irradiation surface and the second irradiation surface, thus to achieve high-efficiency lighting for the three-dimensional space among the laminates. The actual measured luminous efficiency can reach more than 120 lm/W. By limiting the angle of the emitted light and stretching the light spot of light source in the length direction through the light emitting surface of the strip-shaped luminaire, the effect of a linear light source is achieved, meeting the anti-glare requirements. The lens column is integrally formed and cooperatively installed with the lamp holder, eliminating the need for a lampshade design. It is easy to assemble and can be cut to meet different length customization requirements. Thus, the size of the luminaire can be made very thin and small to meet the installation requirements of various embedded luminaire.

BRIEF DESCRIPTION OF THE DRAWINGS

Embodiments of the present invention will be described below with reference to the drawings, in which.

DETAILED DESCRIPTION OF THE INVENTION

Specific embodiments of the present invention will be described in further detail below based on the drawings. It should be understood that the description of the embodiments of the present invention herein is not intended to limit the protection scope of the present invention.

Figure 1:
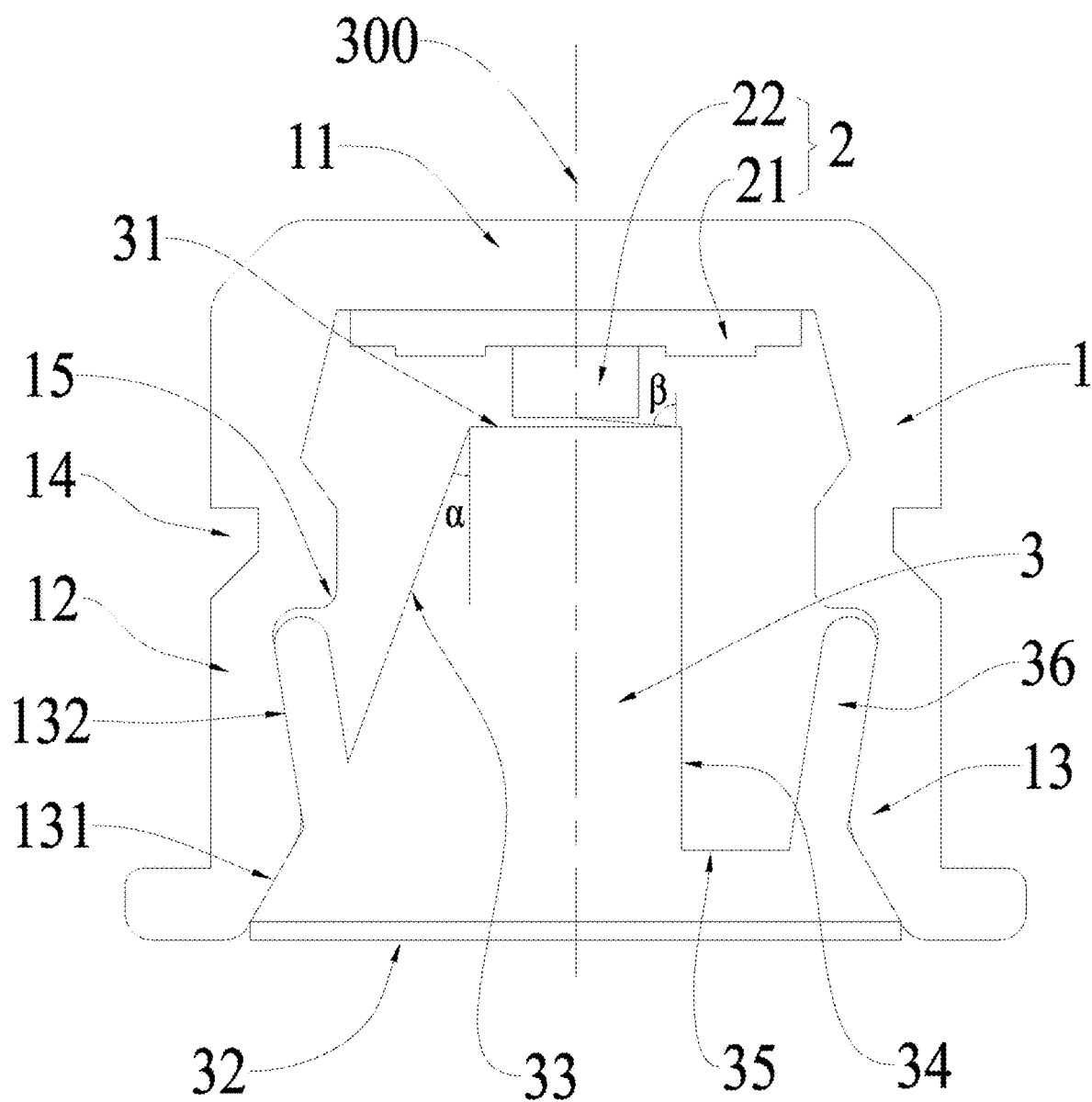
FIG. 1 is a structural schematic diagram of an embodiment of the embedded light-sweeping luminaire of the present invention.
Figure 2:
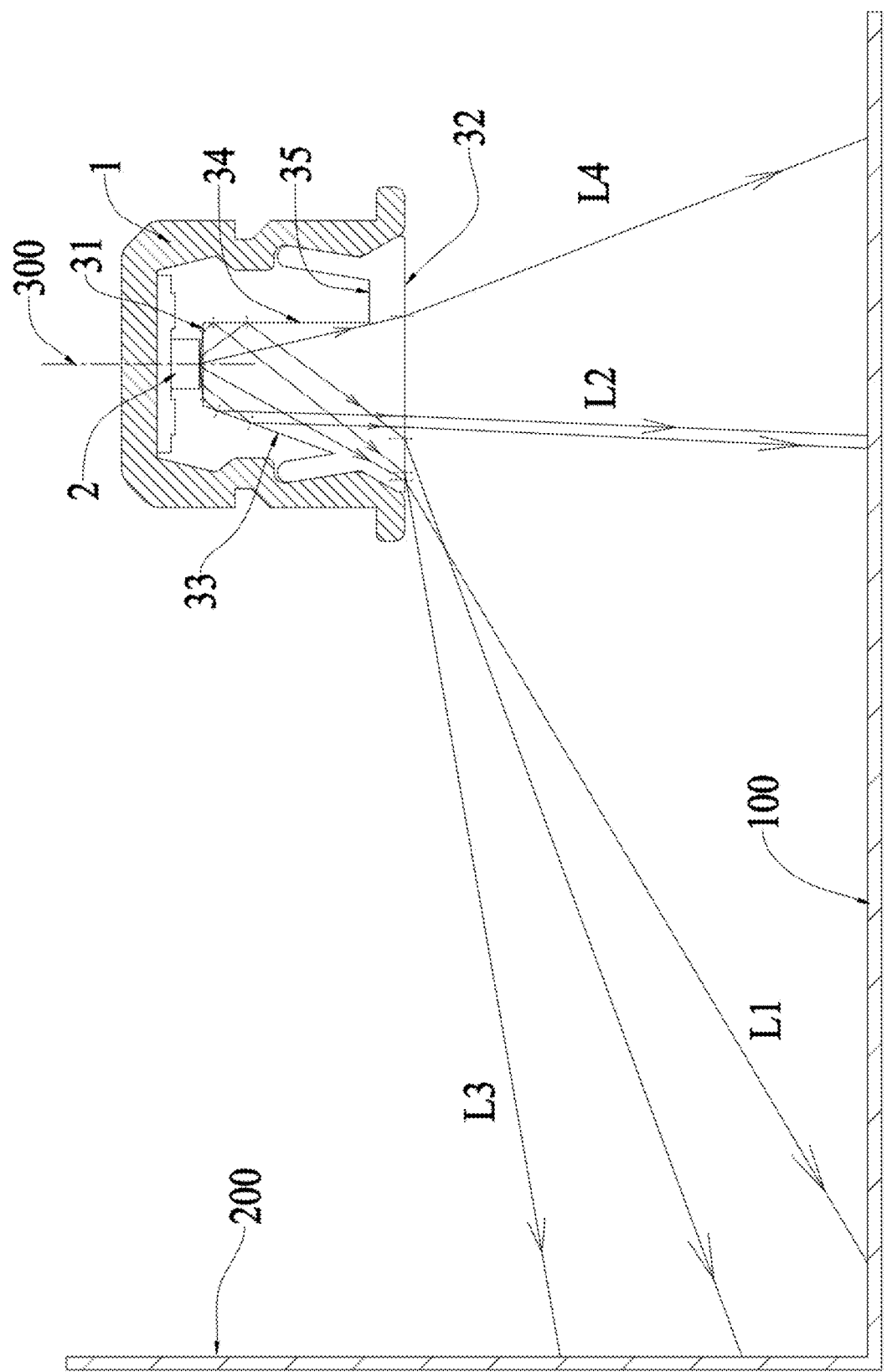
FIG. 2 is an optical principle diagram of the light distribution of the lens column in FIG. 1.
Figure 3:
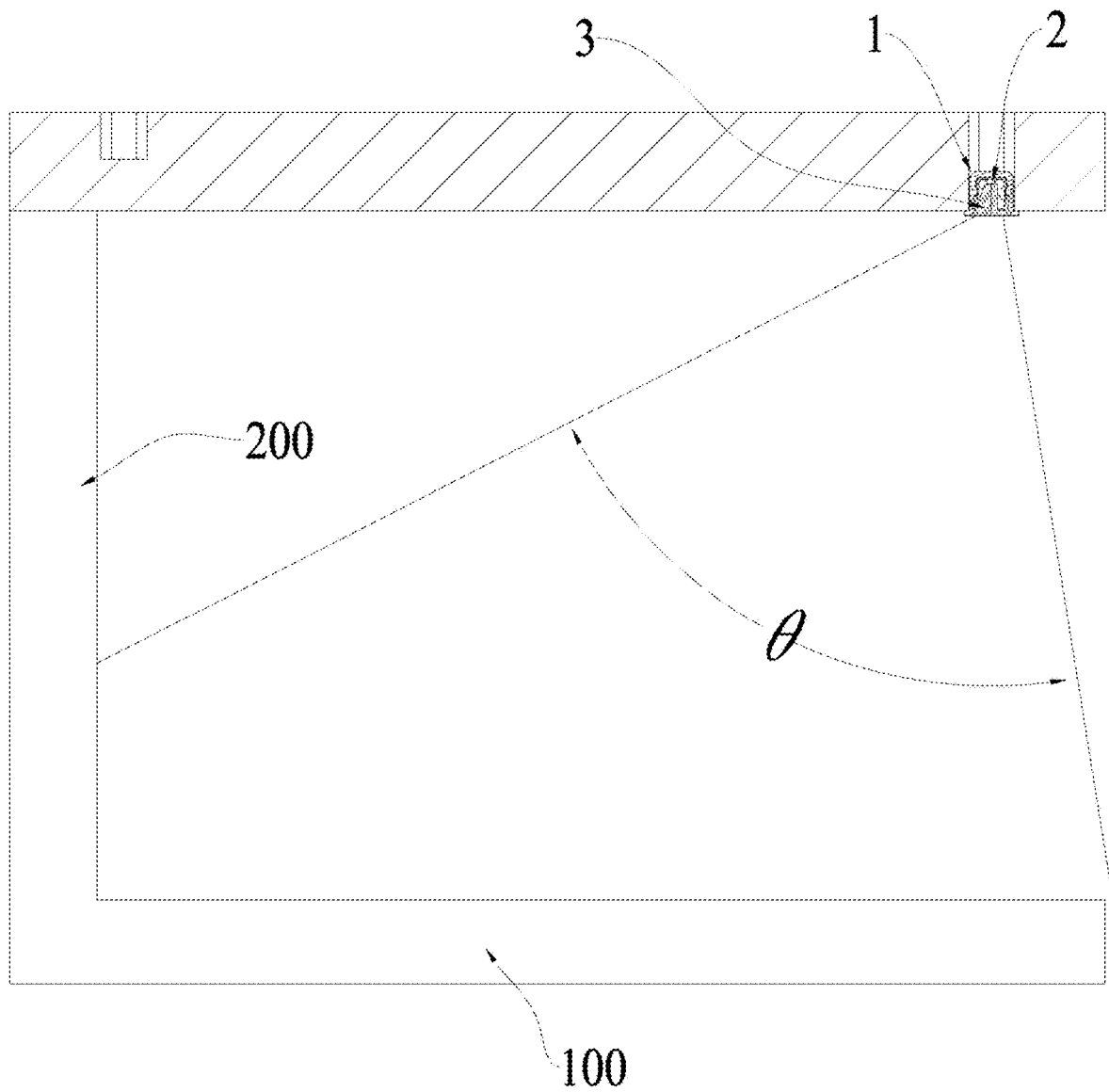
FIG. 3 is a light-sweeping effect schematic diagram when the embedded light-sweeping luminaire of the present invention is in use.
Figure 4:
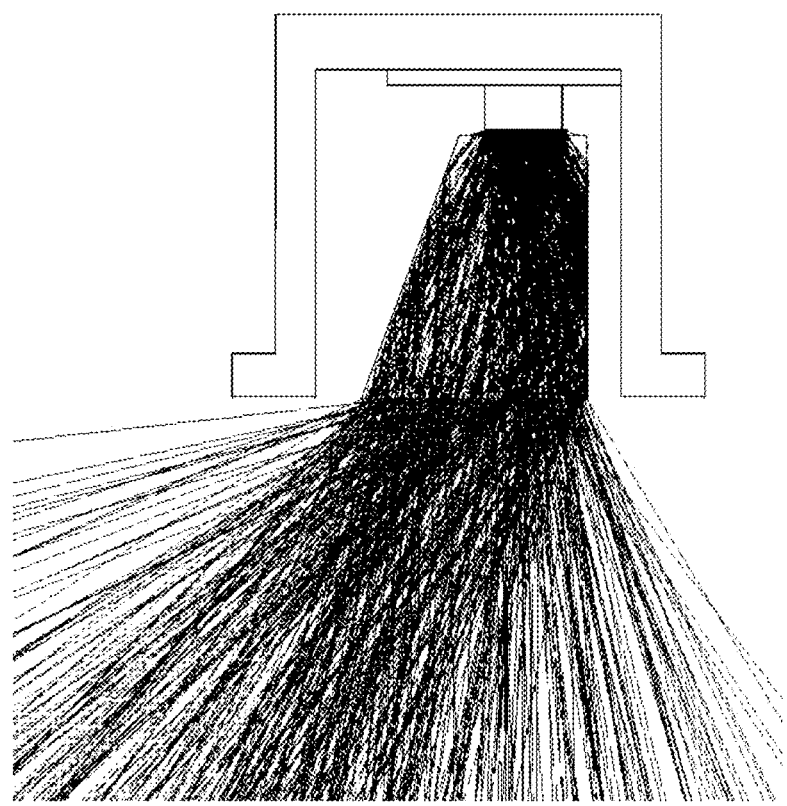
FIG. 4 is a simulated light-sweeping effect schematic diagram of the embedded light-sweeping luminaire of the present invention.

As shown in FIG. 1 and FIG. 2, the embedded light-sweeping luminaire of the present invention comprises a lamp holder 1, a light source module 2 and a lens column 3 arranged in the lamp holder 1. The light source module 2 comprises a substrate 21 and at least one LED light source 22 electrically connected to the substrate 21. The lens column 3 is disposed in the light emitting path of the LED light source 22 and is configured to emit light to the first irradiation surface 100 that is directly facing the light emitting direction and also to emit light to the second irradiation surface 200 in the lateral direction. As an embodiment of the luminaire embedded in a laminate, as shown in FIG. 3, the laminates are horizontally installed on a vertical shelf support. The lamp holder 1 is embedded in the bottom of the laminate. When the luminaire works, light is emitted downward and laterally through the lens column 3. The first irradiation surface 100 belongs to the laminate under the luminaire, and the second irradiation surface 200 belongs to the vertical shelf support. The first irradiation surface 100 and the second irradiation surface 200 form an angle of approximately a right angle.

The lamp holder 1 comprises a base plate 11 and two side plates 12 connected to both sides of the base plate 11. The base plate 11 and the side plates 12 enclose the installation cavity of the luminaire. As shown in FIG. 3, when installing the luminaire, an installation groove can be made to open on the installation surface, and the lamp holder 1 is embedded in the installation groove. The substrate 21 of the light source module 2 may be fixedly connected to the base plate 11 by means of fasteners, etc. The lens column 3 is clamped between the two side plates 12. The present invention distributes the light emitted by the light source module 2 through the lens column 3. Generally, the luminaire is embedded installed on the outer side of the extension portion of the laminate. By embedding and installing the luminaire of the present invention, the emitted light can cover the laminate, the shelf support, and the connected parts.

Further, the lens column 3 includes: a light incident surface 31 arranged close to the LED light source 22; a light emitting surface 32 covering the opening of the lamp holder 1 facing the first irradiation surface 100; a first total reflection surface 33 arranged on the side of the lens column 3 facing the second irradiation surface 200 and connected to the ends of the light incident surface 31 and the light emitting surface 32 on the same side; and a second total reflection surface 34 arranged on the side of the lens column 3 away from the second irradiation surface 200 and extending from the other end of the light incident surface 31 along the light emitting direction toward the light emitting surface 32.

The LED light source 22 comprises a chip optical axis 300. Both the light incident surface 31 and the light emitting surface 32 intersect with the chip optical axis 300. The radial size of the light incident surface 31 is smaller than that of the light emitting surface 32. The first total reflection surface 33 and the second total reflection surface 34 are respectively located on both sides of the chip optical axis 300. The first total reflection surface 33 is configured to reflect a part of the light entering the lens column 3 and then cause said part of the light to emit toward the first irradiation surface 100, and the second total reflection surface 34 is configured to reflect another part of the light entering the lens column 3 and then cause the light to emit toward the second irradiation surface 200.

As shown in FIG. 1, for the lens structure of a specific embodiment, in the radial section passing through the chip optical axis 300, the contour of the first total reflection surface 33 forms an acute angle with the chip optical axis 300, and the contour of the second total reflection surface 34 is parallel to the chip optical axis 300. The projection of the light incident surface 31 along the chip optical axis 300 covers the LED light source 22 to receive most of the light emitted by the LED light source 22 and refract it into the lens column 3.

The optical principle diagram of the light distribution of the lens column 3 is shown in FIG. 2. The light emitted by the LED light source 22 reaches the light incident surface 31 at different incident angles, and enters the lens column 3 after refraction. Some light rays, such as light rays L1 and L4, directly pass through the lens column 3 and are refracted and emitted through the light emitting surface 32. Some light rays, such as light ray L2, are totally reflected by the first total reflection surface 33 to change the light path and then refracted and emitted through the light emitting surface 32. And some light rays, such as L3, are totally reflected by the second total reflection surface 34 to change the light path and then refracted and emitted through the light emitting surface 32. In order to make the irradiated range of the light refracted by the light emitting surface 32 reach a large range of the second irradiation surface 200, the angle between the second total reflection surface 34 and the chip optical axis 300 is configured to be controlled within a small range. Preferably, the second total reflection surface 34 is parallel to the chip optical axis 300. The second total reflection surface 34 guides a large part of the light of the light source to the second irradiation surface 200 through total reflection, thus providing a relatively large light intensity. For common lens materials, whose refractive index of light is between 1.49 and 1.71, in order to strengthen the light intensity of the first irradiation surface 100 by the light reflected by the first total reflection surface 33, the angle α between the first total reflection surface 33 and the chip optical axis 300 is set in the range of 10°-30°. When this angle is too large, the first total reflection surface 33 will not be able to act on the light refracted into the lens column 3.

Accordingly, in one embodiment of the lens column 3 of the present invention, the cross-sectional shape of the lens column 3 is generally a right-angled trapezoid, in which the light incident surface 31 and the light emitting surface 32 are parallel and perpendicularly intersect with the chip optical axis 300, the first total reflection surface 33 is vertically connected between the light incident surface 31 and the light emitting surface 32 on one side of the chip optical axis 300, and the second total reflection surface 34 is obliquely located on the other side of the chip optical axis 300. Preferably, for the light emitted from the LED light source 22 and capable of irradiating the second total reflection surface 34, the maximum incident angle β of these light rays when reaching the light incident surface 31 is set to be not less than 60°. Thus, after these light rays are totally reflected and refracted and then exit from the light emitting surface 32, a large refraction angle is provided, so that the emitted light has a large irradiation range on the second irradiation surface 200. The distance between the light source module 2 and the lens column 3 needs to be adjusted accordingly. According to the above settings, as shown in FIG. 3, in the radial section passed by the chip optical axis 300, the beam angle θ of the light emitted by the lens column 3 is in the range of 60°-80°, which can better cover most areas of the first irradiation surface 100 and the second irradiation surface 200, meeting the lighting requirements in such three-dimensional space.

The light ray L4 in FIG. 2 is configured to just pass outside the lower end surface of the second total reflection surface 34 in the lens column 3 and directly reaches the light emitting surface 32. If the incident angle of the light of the LED light source 22 continues to increase, it will be reflected by the second total reflection surface 34 after being refracted by the light incident surface 31. Therefore, based on the fact that the luminaire is embedded on the outer side of the laminate away from the shelf, the second total reflection surface 34 totally reflects part of the light in the lens column 3, preventing the emitted light from being emitted to the outer side of the shelf at a large emission angle and thus achieving an anti-glare effect.

Figure 5:
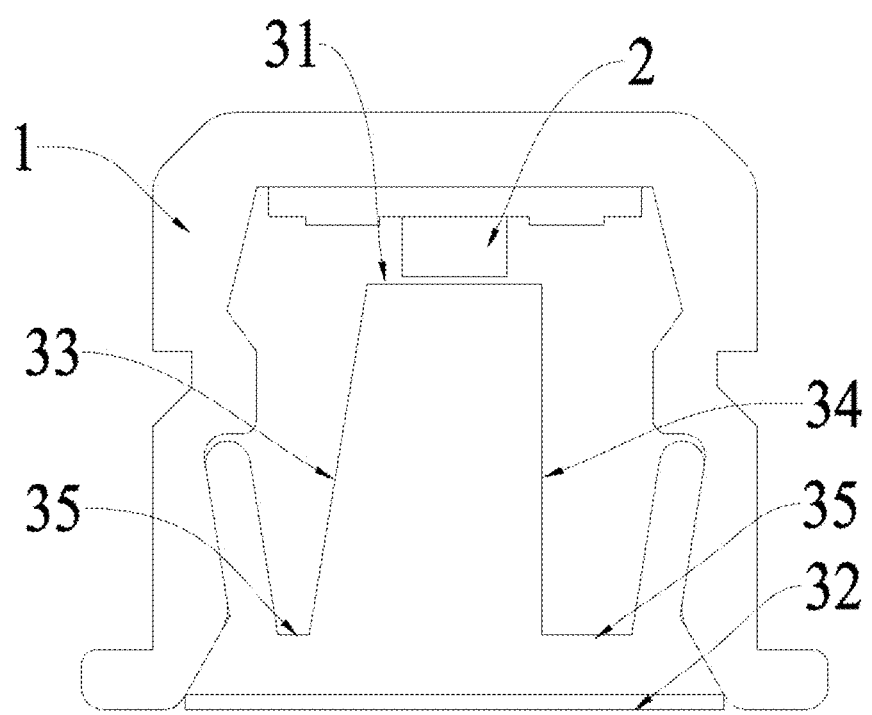
FIG. 5 is a structural schematic diagram of another embodiment of the embedded light-sweeping luminaire of the present invention.

The lens column 3 is preferably an integrally formed structure. The radial size of the light emitting surface 32 of the lens column 3 is configured to be able to cover the opening of the lamp holder 1, so that all the light emitted by the LED light source 22 in the lamp holder 1 passes can through the light emitting surface 32. Since the radial size of the light incident surface 31 is smaller than that of the light emitting surface 32, and the first total reflection surface 33 and the second total reflection surface 34 have set inclination angles, in one embodiment, both or one of the extending ends of the first total reflection surface 33 and the second total reflection surface 34 can be connected to the end of the light emitting surface 32, or one or both of the above-mentioned extending ends are connected to the end of the light emitting surface 32 through a transition surface 35, such as FIG. 5 shows, is one of the embodiments. As shown in FIG. 1 and FIG. 2, in an embodiment of the present invention, the extending end of the second total reflection surface 34 away from the light incident surface 31 is connected to a transition surface 35, and the transition surface 35 extends toward the end of the light emitting surface 32 away from the second irradiation surface 200. A plate body with a certain thickness is formed between the transition surface 35 and the light emitting surface 32, which facilitates the installation of both ends of the lens column 3. The transition surface 35 can be set as a light-shielding medium or the same medium as the light incident surface 31. Since few light rays can reach the transition surface 35, the light intensity of the stray light emitted through the transition surface 35 is weak relatively.

Further, according to the cosine theorem, as the angle between the light emitting direction and the chip optical axis 300 increases, the illumination changes and decreases significantly according to the cube of the cosine of this angle. In the luminaire of the present invention, the radial size of the light incident surface 31 of the lens column 3 is configured to be larger than that of the LED light source 22, which can receive most of the light from the LED light source 22. Therefore, even if some light from the LED light source 22 is emitted outside the light incident surface 31 and causes stray light, its illumination is relatively small and has little impact on human eyes after passing through the lens column 3 and being emitted, thereby reducing glare.

In one embodiment of the present invention, a light-diffusion layer is provided on the light emitting surface 32. After the light from the LED light source 22 is redistributed by the lens column 3 and then softened by the light-diffusion layer to achieve a more comfortable lighting effect.

To facilitate the installation of the lens column 3, a clamping block 13 is protrudingly formed on the inner side of the side plate 12. Clamping portions 36 are formed on both sides of the lens column 3. The clamping portions 36 can be arranged to extend from the ends of the first total reflection surface 33 or the transition surface 35 or the light emitting surface 32 toward the side plate 12. The clamping block 13 and the clamping portion 36 are connected in a mating manner to fix the lens column 3 between the two side plates 12. The clamping block 13 comprises a guiding surface 131 and an abutting surface 132. The guiding surface 131 is connected to the opening of the lamp holder 1. The abutting surface 132 and the guiding surface 131 form an obtuse angle and are configured to abut against the clamping portion 36 in a mating manner. Moreover, the distance between the clamping blocks 13 on both sides is smaller than the distance between the extended ends of the clamping portions 36 on both sides. When the lens column 3 is installed inward from the opening of the lamp holder 1, the clamping portion 36 slides in along the guiding surface 131. After being squeezed at the junction of the guiding surface 131 and the abutting surface 132, it overlaps on the abutting surface 132. Preferably, the clamping portion 36 and the abutting surface 132 have the same extending direction, so that a good fit is achieved between the lens column 3 and the lamp holder 1 after installation.

To embed the lamp holder 1 in an installation groove, an inward recessed clamping groove 14 is formed on the outer side of the side plate 12 to fit the corresponding buckle of the installation groove. At the same time, the side plate 12 is bent inward along the clamping groove 14 to form a bending portion 15. Optionally, the bottom surface of the bending portion 15 facing the opening side of the lamp holder 1 abuts against the top of the clamping portion 36 of the lens column 3 to limit the installation of the lens column 3.

Figure 6:
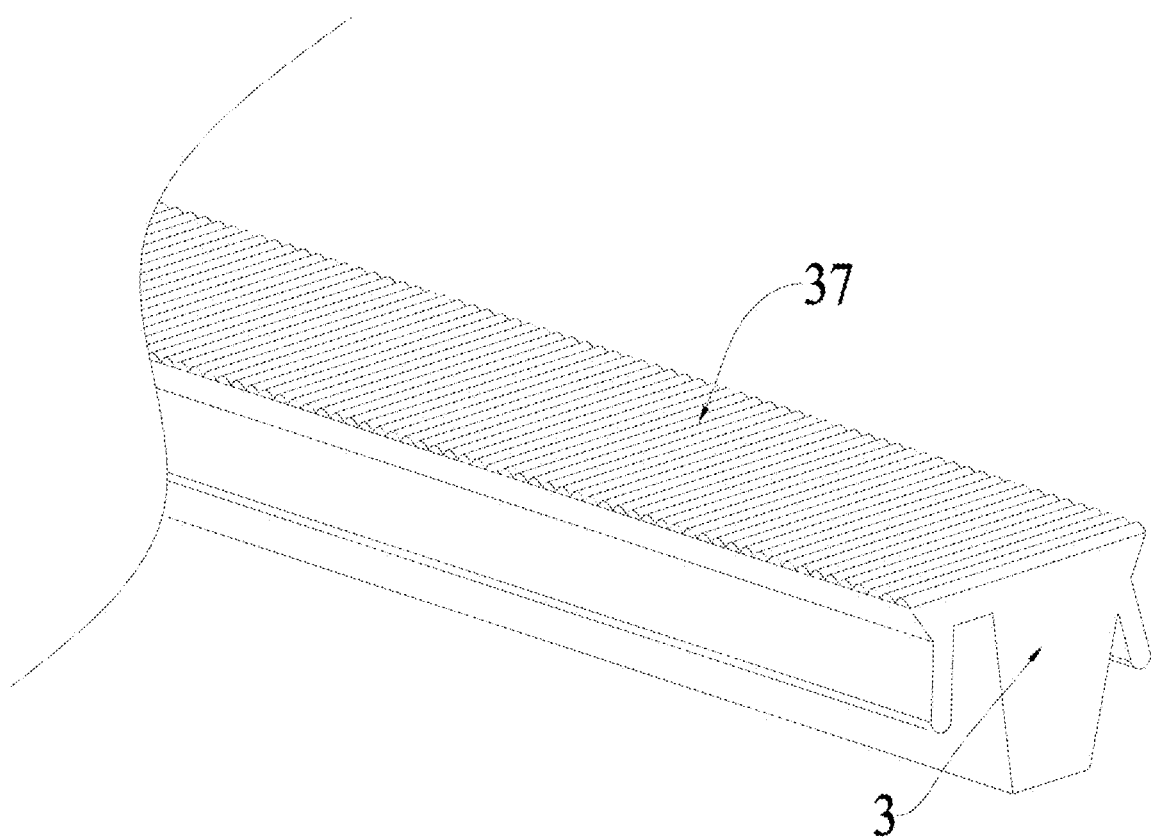
FIG. 6 is a structural schematic diagram of the light emitting surface of the long strip shaped embedded light-sweeping luminaire of the present invention.

For occasions such as cabinets and shelves that require a large illumination area, the high-efficiency embedded light-sweeping luminaire of the present invention is often designed as a strip shaped one. Therefore, in one embodiment as shown in FIG. 6, the lamp holder 1 is strip shaped and includes a length direction. Meanwhile, both the substrate 21 and the lens column 3 extend along the length direction. A plurality of LED light sources 22 are provided on the substrate 21 and are distributed at intervals along the length direction. The lens column 3 is an integrally formed strip shaped lens with multiple optical surfaces. A strip shaped convex lens array 37 is provided on the light emitting surface 32, which is arranged along the length direction of the luminaire. It is used to stretch the light-emitting spot of each LED light source 22 along the length direction. The light-emitting spots of adjacent LED light sources 22 are docked or overlapped to form the effect of a linear light source light distribution.

In the above-mentioned strip shaped luminaire of the present invention, the lamp holder 1, the light source module 2, and the lens column 3 are all structures extending along the length direction, and their longitudinal sections are repetitive. They can be made of cuttable materials to meet customizations of different lengths.

The above are only preferred embodiments of the present invention, and are not used to limit the protection scope of the present invention. Any modification, equivalent replacement or improvement within the spirit of the present invention is covered by the scope of the claims of the present invention.

What is claimed is:

1. An embedded light-sweeping luminaire, characterized in that, comprising a lamp holder (1), a light source module (2) and a lens column (3) arranged in the lamp holder (1);

the light source module (2) comprises a substrate (21) and at least one LED light source (22) electrically connected to the substrate (21), the lens column (3) is disposed in a light emitting path of the LED light source (22) and is configured to emit light to a first irradiation surface (100) directly facing the light emitting direction and a second irradiation surface (200) in the lateral direction;

the lamp holder (1) comprises a base plate (11) and two side plates (12) connected to both sides of the base plate (11), a substrate (21) of the light source module (2) is fixedly connected to the base plate (11), and the lens column (3) is clamped between the two side plates (12);

the lens column (3) comprises: a light incident surface (31) arranged close to the LED light source (22), a light emitting surface (32) covering the opening of the lamp holder (1) facing the first irradiation surface (100), a first total reflection surface (33) arranged on one side of the lens column (3) facing the second irradiation surface (200) and extending from one end of the light incident surface (31) toward the light emitting surface (32) along the light emitting direction, and a second total reflection surface (34) arranged on the side of the lens column (3) away from the second irradiation surface (200) and extending from the other end of the light incident surface (31) toward the light emitting surface (32) along the light emitting direction;

the LED light source (22) comprises a chip optical axis (300), both the light incident surface (31) and the light emitting surface (32) intersect with the chip optical axis (300), the first total reflection surface (33) and the second total reflection surface (34) are respectively located on both sides of the chip optical axis (300), in the radial section passed by the chip optical axis (300), the radial size of the light incident surface (31) is smaller than that of the light emitting surface (32), the contour of the first total reflection surface (33) in the radial section forms an acute angle with the chip optical axis (300), the first total reflection surface (33) is configured to reflect part of the light entering the lens column (3) and then cause the light to emit toward the first irradiation surface (100), and the second total reflection surface (34) is configured to reflect part of the light entering the lens column (3) and then cause the light to emit toward the second irradiation surface (200).

2. The embedded light-sweeping luminaire as claimed in claim 1, wherein in the radial section passed by the chip optical axis (300), the angle formed by the contour of the first total reflection surface (33) and the chip optical axis (300) is 10°-30°, and the contour of the second total reflection surface (34) is parallel to the chip optical axis (300).

3. The embedded light-sweeping luminaire as claimed in claim 1, wherein the extending end of the first total reflection surface (33) and/or the second total reflection surface (34) away from the light incident surface (31) is connected to the end of the light emitting surface (32) through a transition surface (35).

4. The embedded light-sweeping luminaire as claimed in claim 3, wherein the first total reflection surface (33) connects the ends of the light incident surface (31) and the light emitting surface (32) on the same side, and the extending end of the second total reflection surface (34) away from the light incident surface (31) connects to the transition surface (35), and the transition surface (35) extends toward the end of the light emitting surface (32) away from the second irradiation surface (200).

5. The embedded light-sweeping luminaire as claimed in claim 1, wherein in the radial section passed by the chip optical axis (300), the projection of the light incident surface (31) along the chip optical axis (300) covers the projection of the LED light source (22).

6. The embedded light-sweeping luminaire as claimed in claim 1, wherein in the radial section passed by the chip optical axis (300), for the light emitted from the LED light source (22) and capable of irradiating the second total reflection surface (34), the maximum incident angle of the light reaching the light incident surface (31) is set to be not less than 60°.

7. The embedded light-sweeping luminaire as claimed in claim 1, wherein a clamping block (13) is protrudingly formed on the inner side of the side plate (12), and clamping portions (36) are formed on both sides of the lens column (3), each of the clamping portions (36) extends obliquely toward the side plate (12), the clamping block (13) comprises a guiding surface (131) and an abutting surface (132), the guiding surface (131) is connected to the opening of the lamp holder (1), the abutting surface (132) and the guiding surface (131) form an obtuse angle and the abutting surface (132) is configured to abut against the clamping portion (36).

8. The embedded light-sweeping luminaire as claimed in claim 1, wherein a light-diffusion layer is provided on the light emitting surface (32).

9. The embedded light-sweeping luminaire as claimed in claim 1, wherein the lamp holder (1) is long strip shaped, and the lamp holder (1) includes a length direction, the substrate (21) and the lens column (3) both extend along the length direction, a plurality of LED light sources (22) are provided on the substrate (21) and are distributed at intervals along the length direction.

10. The embedded light-sweeping luminaire as claimed in claim 9, wherein a strip shaped convex lens array (37) is provided on the light emitting surface (32), which is arranged along the length direction of the luminaire and is configured to stretch the light-emitting spot of each LED light source (22) along the length direction and cause the light-emitting spots of adjacent LED light sources (22) to dock or overlap.

* * * * *